US008443067B2

(12) United States Patent
Buesgen et al.

(10) Patent No.: US 8,443,067 B2
(45) Date of Patent: May 14, 2013

(54) METHOD AND APPARATUS FOR IDENTIFYING AN ORDER IN A NETWORK

(75) Inventors: Ralph Buesgen, Duluth, GA (US); Ronald Lange, Fürth (DE); Thomas Talanis, Heroldsbach (DE)

(73) Assignee: Siemens Aktiengesellschaft, München (DE)

( * ) Notice: Subject to any disclaimer, the term of this patent is extended or adjusted under 35 U.S.C. 154(b) by 731 days.

(21) Appl. No.: 10/553,380

(22) PCT Filed: Feb. 23, 2004

(86) PCT No.: PCT/EP2004/003071
§ 371 (c)(1),
(2), (4) Date: Oct. 4, 2006

(87) PCT Pub. No.: WO2004/097546
PCT Pub. Date: Nov. 11, 2004

(65) Prior Publication Data
US 2007/0043840 A1    Feb. 22, 2007

(30) Foreign Application Priority Data

Apr. 25, 2003   (DE) ................................. 103 18 837

(51) Int. Cl.
*G06F 15/173* (2006.01)
(52) U.S. Cl.
USPC .......................................... 709/223; 709/224
(58) Field of Classification Search ............... 709/223, 709/224
See application file for complete search history.

(56) References Cited

U.S. PATENT DOCUMENTS

| 5,539,883 | A  | * | 7/1996  | Allon et al. ............... 718/105 |
| 5,574,860 | A  |   | 11/1996 | Perlman et al. |
| 5,936,539 | A  | * | 8/1999  | Fuchs ......................... 340/3.3 |
| 6,098,006 | A  | * | 8/2000  | Sherwood et al. ........... 701/70 |
| 6,144,900 | A  | * | 11/2000 | Ali et al. ..................... 701/19 |
| 6,456,599 | B1 | * | 9/2002  | Elliott ........................ 370/254 |

(Continued)

FOREIGN PATENT DOCUMENTS

| EP | 1 107 108 A1 | 6/2001 |
| EP | 1 424 808 A1 | 6/2004 |
| WO | WO 02/05107 A1 | 1/2002 |

OTHER PUBLICATIONS

Excerpt from "Drive Definition", The American Heritage® Dictionary of the English Language, 4th ed., Houghton Mifflin Company, 2004, accessed Oct. 8, 2009 at <http://dictionary.reference.com/browse/drive>.*

*Primary Examiner* — Joon H Hwang
*Assistant Examiner* — John Isom

(57) ABSTRACT

The invention relates to a method for identifying an order of users of a network, whereby the network contains a multitude of nodes and each of the nodes has a number of connections by which the nodes and the users can be interconnected. Disclosed embodiments of the method include: a) identifying the node connected to one of the users; b) determining the number of connections of this node and a predetermined hierarchy of the connections; c) determining, for these nodes, the connection with which the user is connected to this node and; d) determining, for the nodes, other connections that are connected to other nodes or to other users; e) establishing a relationship between users of the network based on the hierarchy of the connections that is predefined for node and on the determined connections that are connected to users or to other nodes.

14 Claims, 2 Drawing Sheets

U.S. PATENT DOCUMENTS

| | | | |
|---|---|---|---|
| 6,574,664 B1 * | 6/2003 | Liu et al. | 709/224 |
| 7,447,753 B2 * | 11/2008 | Barker | 709/222 |
| 2002/0023181 A1 * | 2/2002 | Brown et al. | 710/8 |
| 2002/0027495 A1 * | 3/2002 | Darby et al. | 340/298 |
| 2002/0050737 A1 * | 5/2002 | Root et al. | 303/7 |
| 2002/0062388 A1 * | 5/2002 | Ogier et al. | 709/238 |
| 2002/0162075 A1 * | 10/2002 | Talagala et al. | 714/819 |
| 2004/0024908 A1 * | 2/2004 | Valdevit et al. | 709/248 |
| 2004/0064552 A1 * | 4/2004 | Chong et al. | 709/224 |
| 2004/0162945 A1 * | 8/2004 | King et al. | 711/122 |
| 2004/0215532 A1 * | 10/2004 | Boman et al. | 705/28 |
| 2004/0247023 A1 * | 12/2004 | Sasai et al. | 375/220 |

* cited by examiner

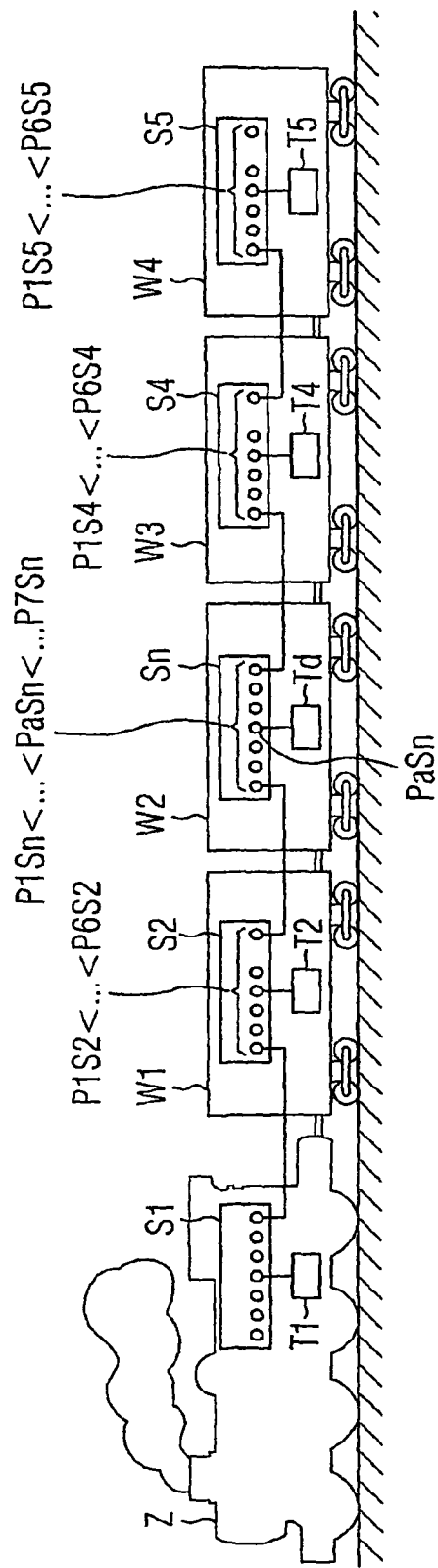

METHOD AND APPARATUS FOR IDENTIFYING AN ORDER IN A NETWORK

CROSS REFERENCE TO RELATED APPLICATIONS

This application is the US National Stage of International Application No. PCT/EP2004/003071, filed Mar. 23, 2004 and claims the benefit thereof. The International Application claims the benefits of German application No. 10318837.1, filed Apr. 25, 2003, both applications are incorporated by reference herein in their entirety.

FIELD OF INVENTION

The present invention relates to a method and an apparatus for identifying an order in a network. The present invention particularly relates to a method and an apparatus for identifying an order of devices in a network. The present invention further relates to a computer program product for implementing the method.

SUMMARY OF THE INVENTION

Networks are known in many variants and embodiments for the most diverse applications. They are always used in situations where a large number of devices are to interact with one another in complex arrangements.

It is nowadays commonplace, for example, for a plurality of devices, e.g. computers and peripherals such as printers, to be interconnected using a so-called ethernet. For this purpose, so-called nodes are provided at a large number of locations, such as inside a building. These nodes themselves in turn have a number of connections. The nodes are interconnected in such a way as to provide a basic framework for a network. One or more devices can now be linked into the network by means of the free connections of the nodes. Data or even commands which are generated by a device such as a computer can then either be transmitted via the network to another computer connected to the network, or else they can be output to a printer connected to the network.

Another well-known example is the pooling of one or more controls, databases, operator units, drives, actuators and sensors to form a network within an automation system. Thus, for example, commands can be entered centrally via an operator unit which are first forwarded via the network to a control and then to the corresponding actuators or other units.

It is essential for all these implementations and applications that information as to which devices are actually in the network is available within the network. U.S. Pat. No. 5,574,860, for example, discloses a network which determines by means of a central unit which devices are currently present in the network. For this purpose the central unit sends a large number of requests via the network. As soon as a device is connected to the network, it sends a message acknowledging the request to the central unit. On the basis of the acknowledgment messages, the central unit determines which devices are currently connected to the network.

In addition, WO02/05107 describes an industrial network whereby, in the event of device failure, a central unit ensures reconfiguration as soon as maintenance personnel have replaced the defective device.

The disadvantage of the method described in U.S. Pat. No. 5,574,860, however, is that a number of requests proportional to the number of nodes in the network is necessary in order to ascertain which devices are connected to the network. This method is therefore very complex and time consuming. Particularly when a comparatively large number of devices are connected to the network, much time is required for identifying and ordering the devices. The method described in WO02/05107 has the disadvantage that a reconfiguration is always centrally controlled by a unit.

The object of the present invention is therefore to specify a method and an apparatus providing a simple way of identifying an order in a network.

This object is achieved by a method, wherein the network contains a large number of nodes and each of the nodes has a number of connections by means of which the nodes and the devices can be interconnected, the method comprising the following steps:
a) identifying the node connected to one of the devices,
b) ascertaining the number of connections of this node and a predefined hierarchy of connections,
c) determining for this node the connection with which the device is connected to this node,
d) determining for this node other connections which are connected to other nodes or devices,
e) establishing a relationship between devices in the network, on the basis of the connection hierarchy predefined for this node and of the determined connections that are connected to devices or other nodes.

The object is further achieved by an apparatus, having
means of identifying the node connected to one of the devices,
means of determining the node connection with which the device is connected to the node,
means of determining other connections of the node which are connected to other nodes or devices,
means of establishing a relationship between network devices, on the basis of the connection hierarchy predefined for the node and of the determined connections that are connected to devices or other nodes.

By the very fact that the connection hierarchy for each node is defined or known in advance, a hierarchy of occupied connections can be deduced for each of the nodes as soon as the occupied connections have been determined. The term occupied connections will hereinafter be used to designate connections of a node which are connected to other nodes or devices of the network. This means that it is possible, using only a small number of steps and therefore very rapidly, to ascertain for each device in the network a relationship to other devices in the network. As the hierarchy of occupied connections is known for each node, a relationship between devices across a plurality of connected nodes can also be determined in a simple manner. Means of assuming these tasks and ascertaining the relationship between devices in a network within a very short time can be provided accordingly.

If the individual procedural steps are executed on a decentralized basis, i.e. by each device in the network, an order of the devices in a network can be very quickly identified taking very little time. Particularly in the event of device failure, for example, there is no need for the entire network to be reconfigured by a central unit once the device has been replaced. Instead, reconfiguration can take place on a decentralized basis in the vicinity of the replaced device.

In particular, each device's upstream neighbors and downstream neighbors can be established from the established order of devices. This is advantageous, for example, if the devices in the network belong to groups having different functions. The nearest device from a group having a specific function can thus be ascertained very quickly for each device.

If the procedural steps are repeated in whole or in part at periodic intervals, each device can detect on a decentralized basis, i.e. for itself, changes in its environment and respond accordingly. As soon as a change is ascertained, this change can be responded to on a decentralized basis and not by the entire network via a central unit. This is particularly advantageous when nodes or even devices are dropped or newly added or failed devices have to be replaced. There is then no need for the whole network to respond to the change via the central unit. Instead the network can be reconstructed on a decentralized basis using the established and therefore known order of the devices, i.e. using the upstream neighbors and downstream neighbors.

Particularly if the relationship of the devices to one another established according to the present invention is stored in appropriate means in devices or nodes, reconstruction can take place very quickly locally if a device replacing another requests the stored relationship of the old device from its neighbor, i.e. upstream neighbor or downstream neighbor. These means can be any kind of storage such as hard disks, diskettes or even memory devices such as flashes.

A computer program product for performing the procedural steps according to the present invention allows new devices to be rapidly linked into the network.

The principle of the present invention will now be explained in greater detail in the following description with reference to the Figures.

BRIEF DESCRIPTION OF THE DRAWINGS

FIG. 3 shows a second implementation for a rail vehicle.

DETAILED DESCRIPTION OF INVENTION

Figure 1:
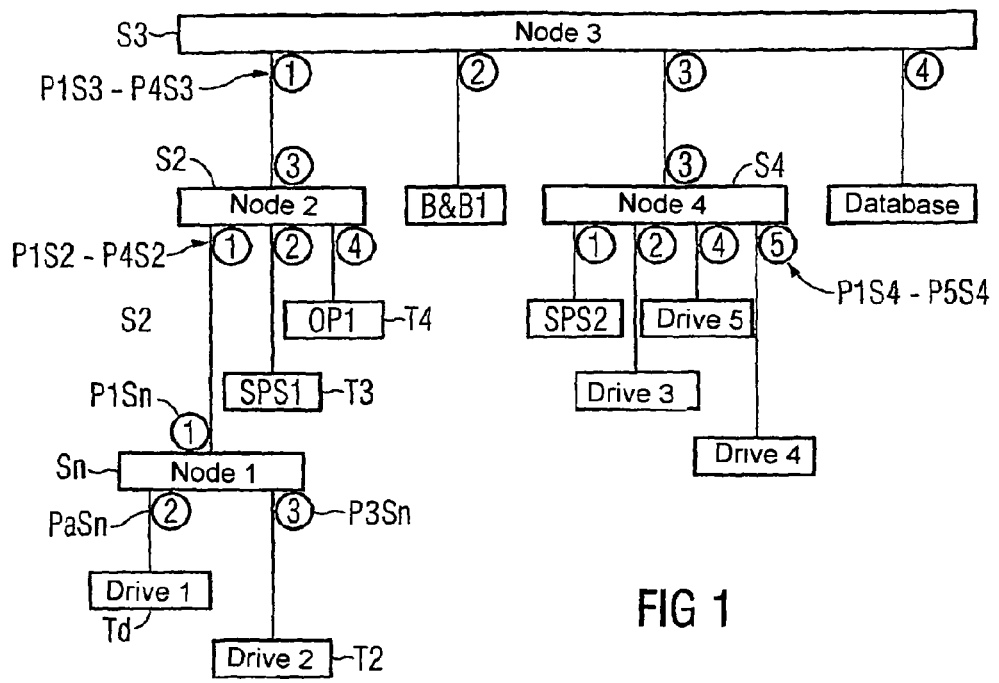
FIG. 1 shows a first implementation in an automation system.

FIG. 1 shows a first implementation of the present invention of the kind that can be provided in an automation system. A large number of nodes Sn, S2, S3 and S4 are interconnected, each of the nodes having a number of connections. For example, the node S3 has the connections P1S3, P2S3, P3S3 and P4S3. The node S3 is connected by means of its connection P1S3 to the connection P3S2 of the node S2. The latter is in turn connected by means of the connection P1S2 to the connection P1 Sn of the node Sn. The other connections which are not occupied by nodes can be occupied by other devices such as controls, databases, operator units, drives, sensors or actuators. For example, the node S3 is connected via the connection P2S3 to an operator unit B&B1 and via the connection P4S3 to a database 4. In addition, the node Sn is connected via the connection PaSn to a drive 1 as device Td and via connection P3 Sn to a drive 2 as device T2. In addition to the above-mentioned assignment, the node S2 is additionally connected via P2S2 to a stored program control SPS1 as device T3 and to an operator unit OP1 as device T4.

Figure 2:
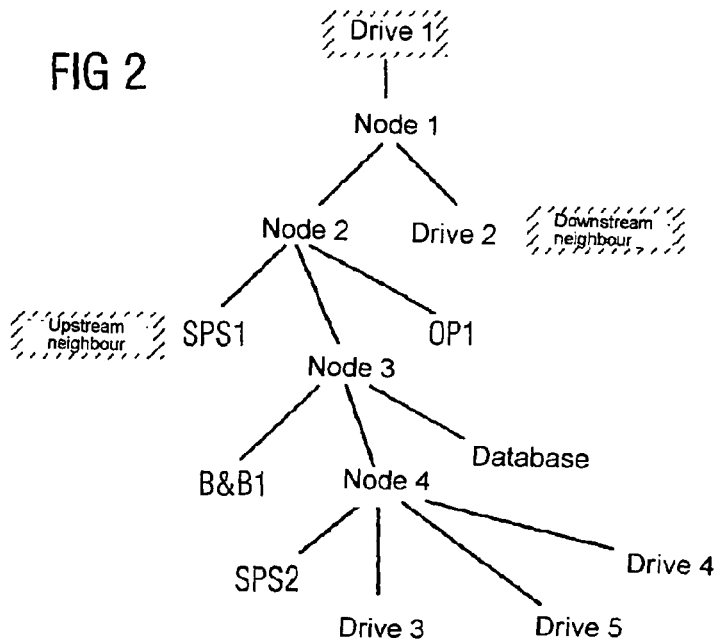
FIG. 2 schematically illustrates an order of the first implementation.

The principle of the present invention will now be described in greater detail using as an example the drive 1 which is designated as device Td in the network. It is first necessary to identify the node to which the device Td is connected. This can be done, for example, by means of a discovery protocol which at the same time also allows the connection PaSn of the associated node to be determined. As soon as the node Sn has been identified as the node associated with the device Td, it must be ascertained in a next step how many connections the node possesses in total. In this example the node Sn has three connections, namely P1Sn, PaSn and P3 Sn. In addition, the generally predefined hierarchy of the connections of node Sn must be ascertained. In the present case the following hierarchy is assumed: P1Sn<PaSn<P3Sn. In another step it must be ascertained which of the connections P1Sn, PaSn and P3 Sn of the node Sn are still occupied. This takes place, for example, by means of an interrogation as to which MAC (Media Access Control) addresses are available at which of the connections. For this purpose an interrogation can take place by means of a protocol such as an Internet Protocol (IP) as to which IP address is assigned to which MAC address. In the present example it will therefore be ascertained that a drive 1 is connected to connection PaSn as device Td and a drive 2 is connected to connection P3 Sn directly as device T2. The steps just described of the method according to the invention in respect of the node Sn must be performed correspondingly in respect of the other nodes of the network. For example, the node S2 has the four connections P1S2, P2S2, P3S2 and P4S2 to which other devices of the network are connected. The stored program control SPS1 is connected via connection P2S2 as device T3, and the operator unit is connected via connection P4S2 as device T4. Furthermore it will be assumed that the connections of the node S2 have the hierarchy P1S2<P2S2<P3S2<P4S2. As the nodes S2 and Sn are directly interconnected, the devices T3 and T4 are also indirectly connected to the node Sn via the node S2. Accordingly, the IP addresses of devices T3 and T4 can then in turn be ascertained using IP protocols. In a last step, the relationship between the devices must now be defined. From the relationship P1Sn<PaSn<P3Sn of the connections of the node Sn it can be directly deduced that the device T2 is the downstream neighbor of device Td, as T2 is connected to P3Sn and Td is connected to PaSn. In the other direction, it can be ascertained via the same relationship that the node Sn is the upstream neighbor of device Td, as S2 is connected to P1Sn and Td is connected to PaSn. As the relationship P1S2<P2S2<P3S2<P4S2 in turn exists for the node S2 and the node Sn is connected to P1S2 and the device T3 is connected to P2S2, the upstream neighbor of device Td can therefore be determined indirectly. As this can be continued accordingly for all the devices of the network, an order of all the devices in the network can therefore be demonstrated via the predefined and therefore known hierarchy of the connections of the individual nodes and the knowledge of which connections are occupied. The resulting order for the implementation shown in FIG. 1 is schematically illustrated in FIG. 2. It should be noted that the hierarchy of the connections of a node only specifies a direction but gives no direct indication as to which is an upstream neighbor or a downstream neighbor. This definition is freely selectable as long as only the relationship of the connections of all the nodes present in the network have the same orientation.

The present invention can then be advantageously used, for example, when it comes to replacing a defective drive in an automation network. Assuming that drive 1 is defective and is replaced by a maintenance engineer, the new drive must first identify which node it is assigned to and which devices are its neighbors, e.g. upstream neighbor or downstream neighbor. If the device T3 has a flash memory in which the relationship or order of Td with respect to T3 determined according to the present invention is stored, the device T3 can provide the replacement device Td with the corresponding stored data as soon as the device Td has identified the device T3 as a neighbor. The replacement device Td can then take over the functions of the old drive directly and without major loss of time. As this takes place locally in a limited vicinity within the network, no time-consuming replanning or reconstruction of the network by a central unit is required.

The embodiment just described in relation to an automation system can of course also be used in similar or modified form in other networks such as an ethernet containing computers and peripherals as devices. The essential feature is always the local and therefore rapid identification of orders of devices. For example, it may be advantageous for a computer to know whether its immediate neighbor is another computer or even a printer. On the other hand it is necessary to determine in which direction the nearest device available in the network is located. For example, it may be important for a computer to know in which direction the nearest printer available in the network is located. It should be noted here, and also in the description in relation to the other implementations, that the terms "direction" and "vicinity" do not necessarily refer to a spatial assignment of the devices of a network. Rather these terms are intended to describe the order of the network. Although identification of a spatial assignment is not part of the essential basic idea, it can play a role in the application of the present invention, as will now be shown with reference to a second implementation.

FIG. 3 shows a second implementation of a kind that can be used, for example, in a means of rail transport. The network here is in a means of rail transport comprising a traction vehicle Z and the cars W1, W2, W3 and W4. The cars W1 and W4 are restaurant cars and therefore belong to a first group of devices. The cars W2 and W3 are passenger cars and belong to another group of devices. The traction vehicle Z contains the node S1. Each of the cars contains a corresponding node S2, Sn, S4, and S5. The node S2 in car W1 has 6 connections P1S2-P6S2 with the hierarchy P1S2<...<P6S2. The node Sn in car W2 has 7 connections P1Sn-P7Sn with the hierarchy P1Sn<...<PaSn<...<P7Sn. Car W3 contains the node S4 with the connections P1S4-P6S4 and the hierarchy P1S4<...<P6S4. The node S5 in car W4 also has 6 connections P1S5-P6S5 with the hierarchy P1S5<...<P6S5. The individual nodes are interconnected in a sequence corresponding to the car arrangement. To each of the node connections there is connected a computer in each case. For example, the computer of the car W2 is connected to a connection PaSn and shall hereinafter be referred to as device Td. Correspondingly a device T1 is in the traction vehicle Z, a device T2 in W1, a device T4 in W3 and a device T5 in W4. On the basis of the disposition of the connections and their hierarchy, the neighbors, for example, of device Td can now be determined using the present invention. For this purpose, again the node Sn to which the device Td is connected must first be determined. Accordingly the number of available connections of the node Sn as well as the hierarchy must be determined, then the connection PaSn to which the device Td is connected must be determined, as well as the other connections which are connected to other nodes or connections. The same must be done for the other nodes S1, S2, S4 and S5. Finally the relationship of the devices T1, T2, Td, T4 and T5 to one another then still has to be established. In this implementation it emerges that the device T4 and then device T5 are in one direction, i.e. in the direction of the end of the train. The T2 and then the T1 in the traction vehicle are in the other direction, towards the traction vehicle itself. Via the IP addresses of the individual devices, which then also identify device T2 and device T5 as restaurant cars W1 and W4 and therefore as belonging to one group of devices, the computer as device Td in car W2 can provide the passengers with information as to the direction in which the nearest restaurant car is situated, i.e. in this case in the direction of the traction vehicle. In this application also, the present invention allows dynamic and therefore rapid adaptation, in this case of the passenger guidance system, as soon as the disposition of the cars changes, e.g. in the event of remarshalling.

Although the present invention has been described with reference to the two embodiments shown, it is not limited to these two implementations. Rather the invention can always be used when it is question of locally establishing an order of devices within a network and therefore reacting quickly to local changes of devices in the network. The use of the method and apparatus according to the invention is also independent of the structure of the network, whether it be a one-dimensional network as in the case of the means of rail transport, or even a multidimensional network as in the automation network described. For example, in many cases it may be important to ascertain the immediate neighbor of a device. In other applications it is important to ascertain the nearest device in a particular group of devices. The present invention allows changes in the network to be responded to dynamically by means of the local availability of knowledge of an order of devices within the network.

The invention claimed is:

1. In an automation network comprising a plurality of nodes, each node comprising one or more connections to connect each node to one or more devices and one or more other nodes, a method for reconstruction of the network on a decentralized basis when replacing a device, the method comprising:
  (a) identifying, by each device in the network in a distributed manner, an order of devices in the network defining a relationship between the devices based on predefined hierarchies of connections for each node specifying a direction defining an order for all available connections, comprising, correspondingly for each device in the network:
    (i) identifying a corresponding device's associated node;
    (ii) determining the order of devices by ascertaining, for the corresponding device's associated node, a number of available connections and the predefined hierarchy for the available connections, which of the number of connections is connected to the corresponding device and a hierarchy for the connection to the corresponding device, and which of the number of connections are still occupied and connected to other nodes and other devices and the hierarchies for the connections still occupied and connected to other nodes and other devices, such that the direction defining the order for all available connections also defines a corresponding upstream or downstream direction for the other connected nodes and devices thereby establishing each device's upstream and downstream neighboring devices; and
    (iii) distributively storing the order of devices in the corresponding device, wherein the order of devices stored in each device in the network in accordance with (i)-(iii) comprises the order of all of the devices including direct relationships for the devices connected to the corresponding device's associated node and indirect relationships for the devices connected to other connected nodes;
  (b) upon replacing a first device with a replacement device by connecting the replacement device to a first node in place of the first device, identifying, by the replacement device, the replacement device's associated node and which of the other devices is a neighbor of the replacement device; and
  (c) receiving, by the replacement device, locally from the neighbor of the replacement device, the stored order of all of the devices; and
  (d) reconstructing the network on a decentralized basis using the stored order of all of the devices received from the neighbor.

2. The method according to claim 1, wherein each device determines which of the other devices is an upstream neighbor and which of the other devices is a downstream neighbor based on the stored order of all of the devices.

3. The method according to claim 1, wherein each step of the method is repeated periodically.

4. The method according to claim 1, wherein the recited steps are repeated whenever any one of said other devices is no longer connected to the network.

5. The method according to claim 1, wherein the recited steps are repeated whenever a new device is connected to the network.

6. The method according to claim 1, wherein the recited steps are repeated whenever any one of said other devices is replaced by a new device.

7. The method according to claim 1, wherein determining which of the number of connections are still occupied and connected to other nodes and other devices is performed with MAC addresses.

8. The method according to claim 1, wherein the step of identifying the order of devices includes determining IP addresses of all the other devices.

9. The method according to claim 1, wherein the method is executed by a computer program product.

10. The method according to claim 1, applied to an automation system containing controls, operator units, drives and actuators as the devices.

11. The method according to claim 1, wherein the network is an Ethernet containing personal computers or peripherals as the devices.

12. The method according to claim 1, applied to a network installed in a rail transport system containing traction vehicles and cars as the devices.

13. In a reconfigurable network comprising a plurality of devices physically interconnected in a sequence, a method for identifying an order of devices in the network indicating relative spatial arrangements among the devices including directional information, wherein the network contains a number of nodes interconnected in a sequence corresponding to the interconnection of the devices, and wherein each of the nodes has a number of connections for interconnecting the nodes and the devices, the method comprising:
configuring the network according to a first hierarchical arrangement of the connections which includes relationships among the nodes indicating the relative spatial arrangements among the devices including directional information by:
identifying, by each device in the network in a distributed manner, an order of devices in the network indicating a relationship between the devices based on predefined hierarchies of connections for each node specifying a direction defining an order for all available connections, comprising, correspondingly for each device in the network:
(i) identifying a corresponding device's associated node and type of device;
(ii) determining the order of devices by ascertaining, for the corresponding device's associated node, a number of available connections and the predefined hierarchy for the available connections, which of the number of connections is connected to the corresponding device and a hierarchy for the connection to the corresponding device, and which of the number of connections are still occupied and connected to other nodes and other devices and the hierarchies for the connections still occupied and connected to other nodes and other devices, such that the direction defining the order for all available connections also defines a corresponding upstream or downstream direction for the other connected nodes and devices thereby establishing each device's upstream and downstream neighboring devices; and
(iii) distributively storing the order of devices in the corresponding device wherein the order of devices stored in each device in the network in accordance with (i)-(iii) comprises the order of all of the devices including direct relationships for the devices connected to the corresponding device's associated node and indirect relationships for the devices connected to other connected nodes indicating the relative spatial arrangements among all of the devices;
providing by each device in the network the directional information and the type of device for the other devices in the network.

14. The method of claim 13 wherein the network comprises a plurality of computer devices each positioned on a vehicle or car in a transport arrangement to provide passengers with the directional information and the type of device for the other devices in the network.

* * * * *